United States Patent [19]

Stoltzfus

[11] Patent Number: 5,662,314
[45] Date of Patent: Sep. 2, 1997

[54] WHEEL SPRING SUPPORT FRAME FOR VEHICLES

[75] Inventor: Jacob K. Stoltzfus, Goshen, Ind.

[73] Assignee: Leland Engineering, Inc., White Pigeon, Mich.

[21] Appl. No.: 752,750

[22] Filed: Nov. 20, 1996

Related U.S. Application Data

[63] Continuation of Ser. No. 552,913, Nov. 3, 1995, abandoned.
[51] Int. Cl.[6] .................................................. B60G 11/12
[52] U.S. Cl. ........................................ 267/271; 267/47
[58] Field of Search ............................ 267/47, 52, 230, 267/260, 271; 280/718

[56] References Cited

U.S. PATENT DOCUMENTS

| | | | |
|---|---|---|---|
| 2,445,295 | 7/1948 | Pond | 267/271 |
| 3,147,963 | 9/1964 | Frazier | 267/271 |
| 3,304,096 | 2/1967 | Hanover | 267/52 |
| 3,596,923 | 8/1971 | Nakamura | 267/271 |
| 3,912,294 | 10/1975 | Raidel | 267/271 |

*Primary Examiner*—Robert J. Oberleitner
*Assistant Examiner*—Chris Schwartz
*Attorney, Agent, or Firm*—Baker & Daniels

[57] ABSTRACT

A wheel spring support frame for attaching a leaf spring to the underside of the frame of a vehicle. The support frame has a substantially U-shaped cross-section with parallel sidewalls connected by an upper member attached to the vehicle's frame. The sidewalls have spaced, downwardly projecting flanges which oppose the flanges of the other sidewall. Reinforcing spacers extend between the sidewalls, adjacent to the flanges. Each flange has an aperture aligned with the aperture of the opposing flange for accepting a fastener. The ends of the leaf spring are supported by the fasteners.

6 Claims, 3 Drawing Sheets

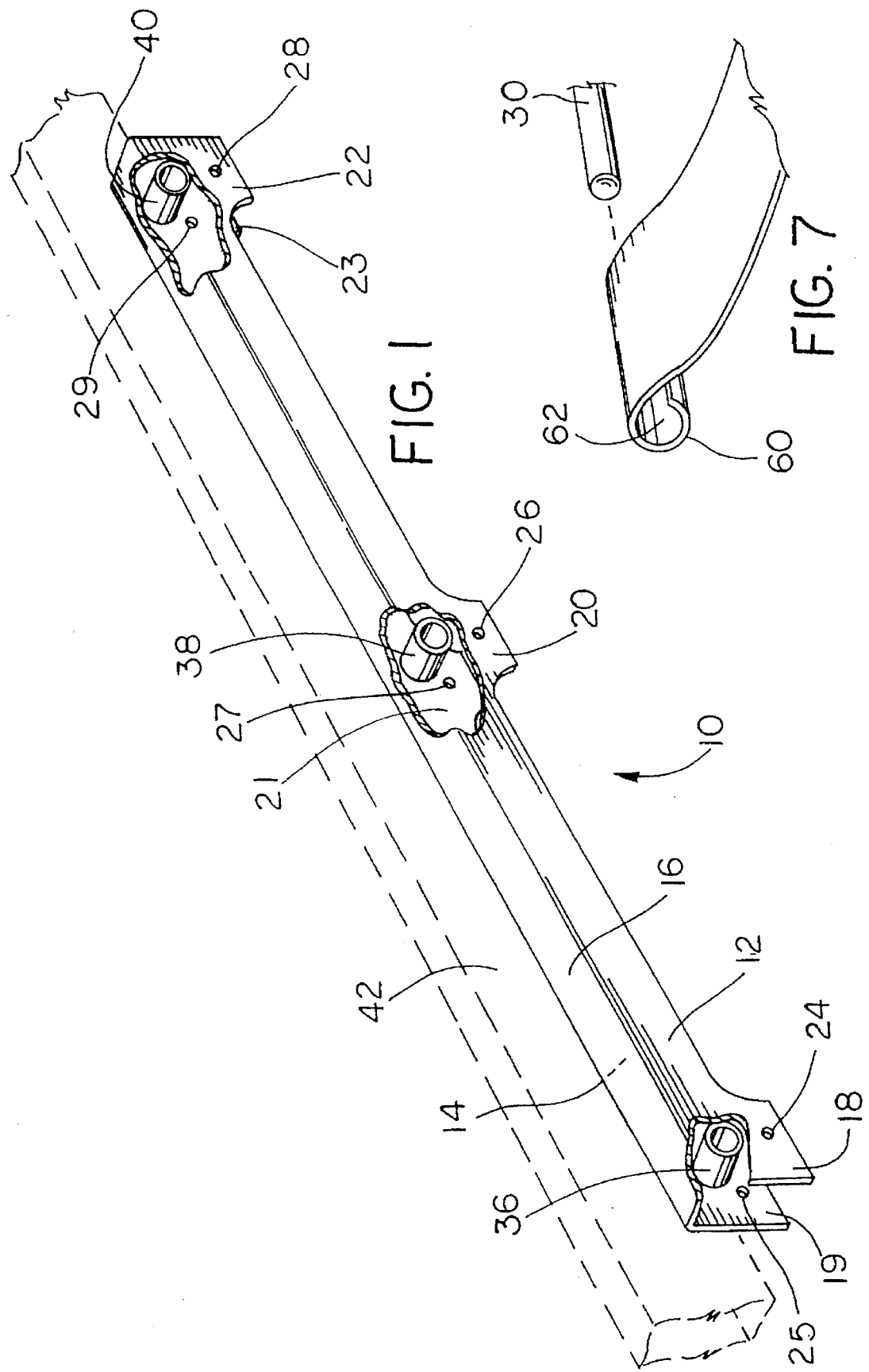

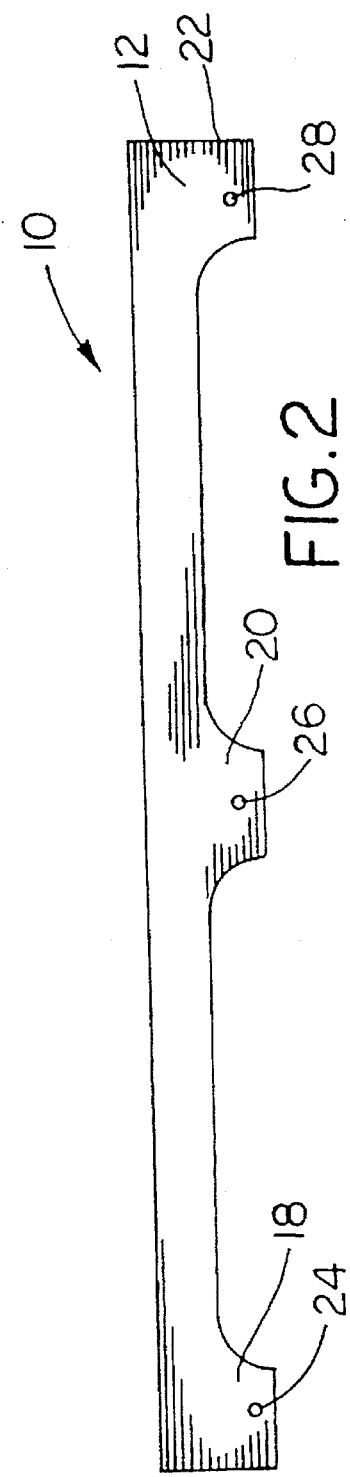
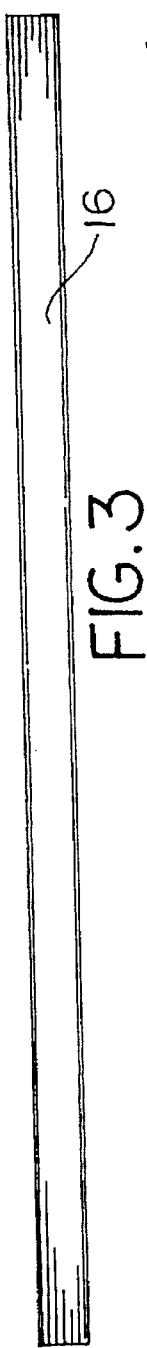
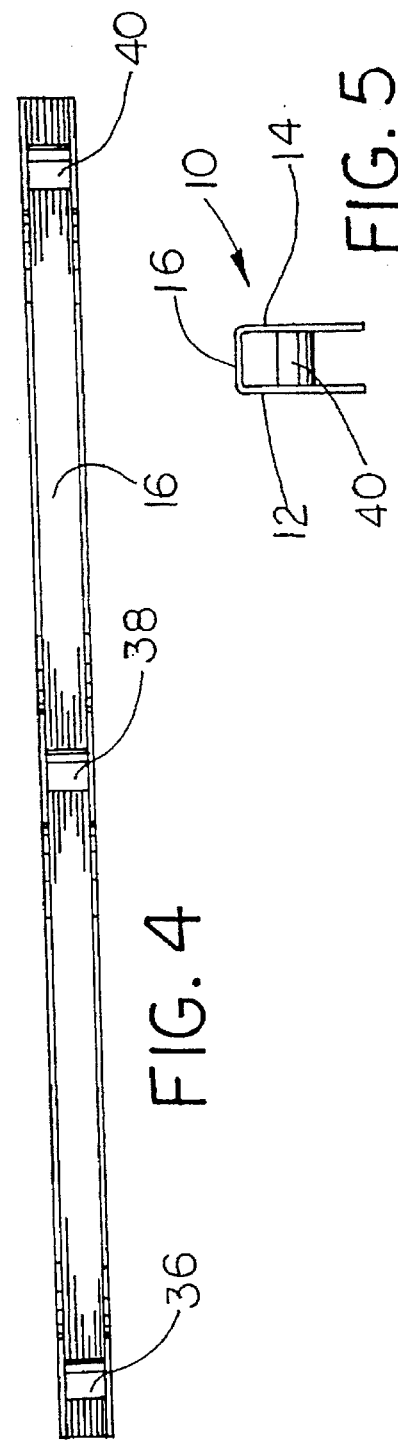
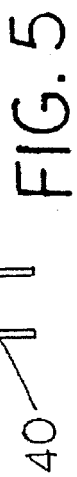

WHEEL SPRING SUPPORT FRAME FOR VEHICLES

This is a continuation of application Ser. No. 08/552,913, filed Nov. 3, 1995, abandoned.

The present invention relates to a wheel spring support frame for attaching leaf springs to the frame of a vehicle.

BACKGROUND OF THE INVENTION

Various vehicle suspension designs use leaf springs to dissipate vibration and shock encountered when traveling over uneven terrain. The leaf spring is attached to the vehicle axle, and has a pair of opposite ends which are connected to the vehicle frame. Leaf springs have heretofore been connected to the vehicle frame through individual mounting brackets.

In prior art suspension systems, large stresses are transferred to the individual mounting brackets. When the vehicle encounters a bump, the axle moves vertically, flattening the leaf spring. Accordingly, large forces are transferred through the ends of the leaf spring, exerting forces on the mounting brackets along the vehicle's line of travel. The mounting brackets are thereby forced away from one another and caused to pull away from the vehicle frame. Any lateral motion of the vehicle caused by cornering or driving on an inclined surface, for example, causes lateral stresses on the individual mounting brackets. These stresses also cause the mounting brackets to tear away from the vehicle frame.

Careful placement of the prior art individual mounting brackets is required to ensure proper leaf spring operation. Proper leaf spring functioning depends in part on the spring having proper deformation while under its intended load. Proper deformation requires accurate location of the ends of the leaf spring relative to one another. Thus, the distance between brackets supporting opposite ends of a leaf spring must be carefully controlled for each spring installation. Accordingly, installation of prior art suspension systems is often difficult, complicated and expensive.

SUMMARY OF THE INVENTION

The present invention comprises a wheel spring support frame for connecting leaf springs to the underside of a vehicle frame. The support frame has a generally U-shaped cross-section with parallel, longitudinally extending sidewalls joined together by an upper web. Each sidewall has at least two spaced attachment flanges which are laterally aligned with the corresponding flanges of the opposite sidewall to accommodate a leaf spring. A spacer extends between the attachment flanges and is attached to the inner surfaces of the flanges to reinforce the support frame.

Accordingly, an advantage of the present invention is that an integrated wheel spring support frame with leaf spring attachment flanges reduces the tendency of the leaf spring to separate from the vehicle frame in response to leaf spring deformation.

Another advantage of the present invention is that a leaf spring support frame provided with reinforcing spacers is better able to withstand the lateral stresses resulting from the vehicle's lateral motion than are individual mounting brackets without reinforcing spacers.

Yet another advantage is that suspension system assembly is simplified because a support frame inherently locates the leaf spring attachment flanges in their proper relative positions.

Other advantages will become apparent upon a reading of the following description.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a fragmentary perspective view of a wheel spring support frame made pursuant to the teaching of the present invention illustrated mounted on a vehicle frame illustrated in phantom;

FIG. 2 is a side view of the wheel spring support frame illustrated in FIG. 1;

FIG. 3 is a top view of the wheel spring support frame illustrated in FIG. 1;

FIG. 4 is a bottom view of the wheel spring support frame illustrated in FIG. 1;

FIG. 5 is an end view of the wheel spring support frame illustrated in FIG. 1;

FIG. 7 is a fragmentary view illustrating an end of the leaf spring that connects to the wheel spring support frame.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 6:
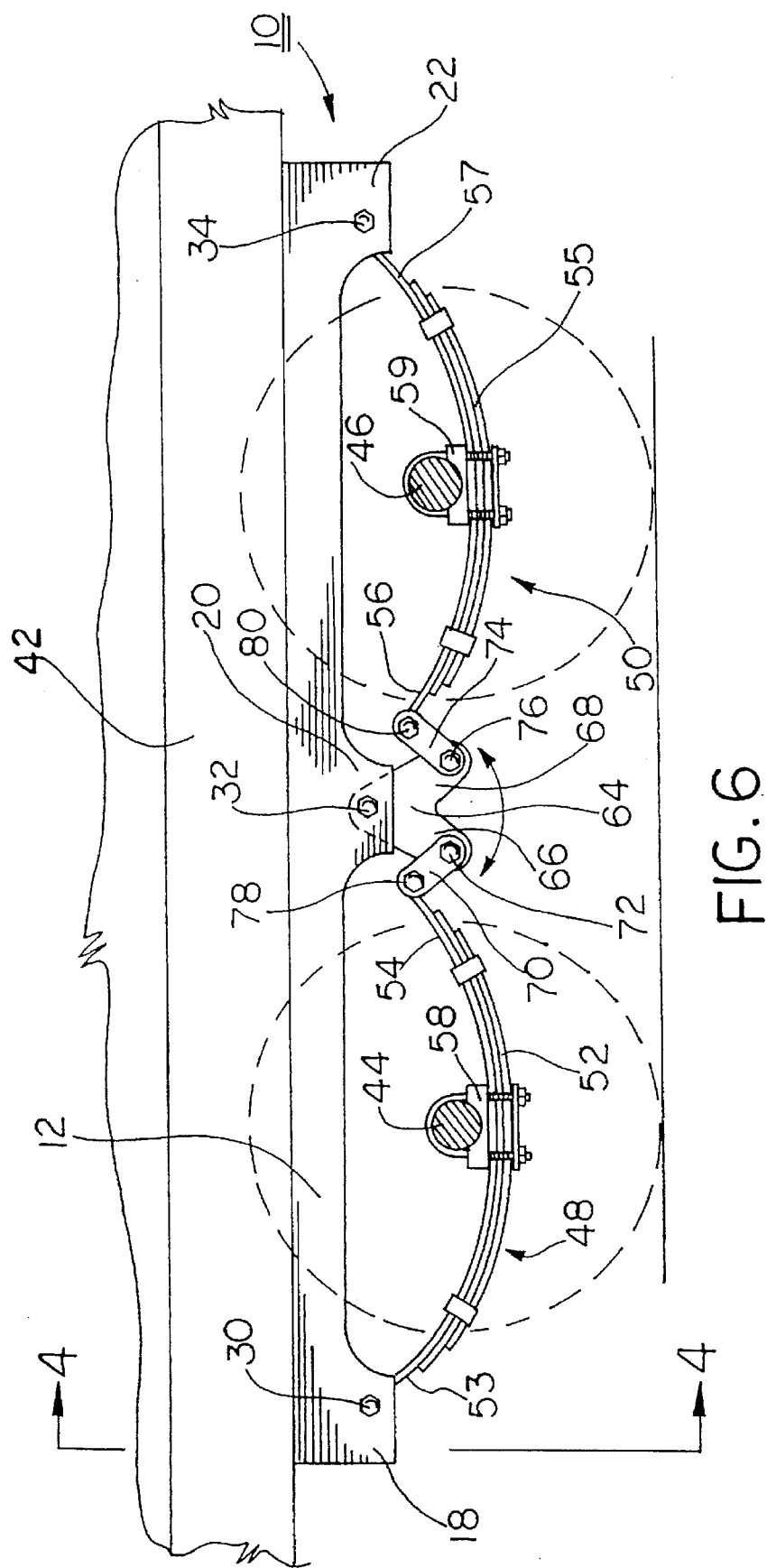
FIG. 6 is a fragmentary side view illustrating a typical application of the wheel spring support frame of this invention to a vehicle and a set of leaf springs.

Referring now to the drawings, a wheel spring support frame generally designated 10 has a substantially U-shaped cross-section defined by two parallel, elongated sidewalls 12,14, connected together by a elongated upper web 16 extending perpendicularly between sidewalls 12,14. As shown in FIGS. 2 though 5, support frame 10 is symmetric about the longitudinal centerline of upper web 16.

Sidewalls 12,14 have a first pair of laterally aligned attachment flanges 18,19 which project downwardly when support frame 10 is installed on vehicle frame 42, a second pair of laterally aligned, downwardly projecting attachment flanges 20,21 and a third pair of laterally aligned, downwardly projecting attachment flanges 22,23. Registering apertures 24,25 are provided in flanges 18,19; registering apertures 26,27 are provided in flanges 20, 21 and registering apertures 28,29 are provided in flanges 22,23. Each pair of apertures receives a corresponding fastener 30,32 or 34'. Reinforcing spacers 36,38,40 extend between sidewalls 12,14, adjacent to each pair of flanges and are offset from upper web 16.

Referring now to FIG. 6, support frame 10 secures a pair of leaf springs 48,50 to frame 42 of the vehicle. Leaf spring 48 includes a curved working portion 52 and a pair of end portions 53,54. Similarly, leaf spring 50 includes a curved working portion 55 and a pair of end portions 56,57. Axle 44 is connected to working portion 51 of spring 48 by conventional clips 58, and axle 46 is connected to working portion 55 of spring 50 by conventional clips 59. Each of the end portions 53,54, and 56,57 terminates in a turned over portion 60 which defines a bore 62 that receives a fastener, such as fastener 30, as will hereinafter be explained.

A spring shackle support member 64 is secured to the attachment flanges 20,21 of spring support frame 10 by a pin-like fastener 32 which is received within registering apertures 26,27 provided in flanges 20,21 and in a registering aperture extending through shackle support 64. Shackle support 64 includes a pair of diverging arms 66,68. A pair of spring shackles, only one of which is illustrated at 70, are pivotably connected to arm 66 by a pin-like fastener 72 which extends through registering apertures in the shackles and arm 66. Similarly, a pair of spring shackles, only one of which is illustrated at 74, are pivotably connected to arm 68 of shackle support 64 by a fastener 76.

Leaf spring 48 is attached to support frame 10 by fastener 30 which extends through apertures 24,25 on sidewalls 12,14 and through bore 62 on end 53 of leaf spring 48. Similarly, the other end 54 of leaf spring 48 is attached to spring shackles 70 by pin-like fastener 78, which extends through the bore (not shown) formed on end 54 of spring 48 similar to bore 62 formed on end 53 of spring 48. Similarly, leaf spring 50 is secured to support frame 10 by pin-like fastener 34 which extends through apertures 28,29 on the sidewalls 12,14 and through the bore (not shown) on end 57 of leaf spring 50. End 56 of leaf spring 50 is attached to spring shackles 74 by pin-like fastener 80 in the same way as end 54 is secured to shackles 70 by pinolike fastener 78.

MODE OF OPERATION

In use, spring support frame 10 is secured below vehicle frame member 42 in any suitable manner, such as by welding. The distances between apertures 24,26,28 in sidewall 12 and the distances between apertures 25,27,29 in sidewall 14 are closely controlled during manufacturing of spring support frame 10. Since these apertures are interconnected by either sidewall 12 or sidewall 14, the distances between the attachment points of leaf springs 48,50 with the spring support frame 10 is closely controlled. Accordingly, installation of the suspension system on the vehicle is simplified.

Furthermore, the sidewalls 12,14 resist deformation due to normal flexing of leaf springs 48,50. As discussed above, during normal use, leaf springs 48,50 tend to flatten out when the vehicle is driven over bumps or other irregularities. Accordingly, ends 53,54 of leaf spring 58 and corresponding ends 57,56 of leaf spring 50 have a tendency to be driven apart. In prior art devices, in which attachment fixtures are entirely separate from one another, this normal flexing of the leaf springs tends to displace the attachment fixtures relative to one another. By use of the support frame of the present invention, in which the attachment flanges are interconnected by sidewalls 12,14, such displacement is resisted, and the stress induced by normal operation of the suspension system is transferred directly to vehicle frame 42 through spring support frame 10.

As also discussed above, lateral or twisting forces are exerted through the ends of the leaf spring during cornering, travelling up and down hills, etc. These twisting forces tend to twist the attachment fixtures in prior art devices. In the present invention, these twisting forces are partially resisted by use of the support frame of the present invention which interconnects the attachment flanges by sidewalls 12,14. The twisting forces are further resisted by spacers 36,38,40 which extend between sidewalls 12,14 adjacent to the attachment flanges.

What is claimed is:

1. A wheel spring support frame for attaching first a leaf spring, said first leaf spring having a pair of end portions, said support frame comprising parallel longitudinally extending sidewalls having opposite ends and joined together by a web extending between said ends, each sidewall including at least two spaced integral attachment means for attaching said end portions of said leaf spring to said sidewalls, one of said attachment means of one said sidewall and another of said attachment means of the other of said sidewalls being laterally aligned to accommodate said leaf spring therebetween;

wherein each of said attachment means includes an aperture for receiving a fastener for securing said first leaf spring to said attachment means;

and wherein a reinforcing member extends between said sidewalls at each of said attachment means, said reinforcing member being offset from said web and from said apertures of said attachment means.

2. A wheel spring support frame as set forth in claim 1, wherein each of said reinforcing members are cylindrical.

3. A wheel spring support frame as set forth in claim 1, wherein each of said attachment means includes a downwardly projecting flange and said aperture of each attachment means is defined within the corresponding flange.

4. A vehicle suspension system as set forth in claim 1 wherein said attachment means includes a leaf spring attachment flange.

5. A wheel spring support frame as set forth in claim 1 and a first leaf spring 4 wherein said fasteners includes a pin extending through each of said apertures, said end portions of said first leaf spring having openings extending therethrough and registering with said apertures to receive said pins.

6. A wheel spring support frame as set forth in claim 1 and first and second leaf springs 1 wherein said attachment means includes a spring shackle pivotally mounted on said support frame, said second leaf spring including an end portion connected to said spring shackle and an opposite end portion connected to said support frame, one said end portions of said first leaf spring being connected to said spring shackle, the other end portion of said first leaf spring being connected to said support frame.

\* \* \* \* \*